(12) United States Patent
Tamblyn (10) Patent No.: US 11,864,506 B2
(45) Date of Patent: Jan. 9, 2024

(54) CANNABIS TRIMMING ASSEMBLY

(71) Applicant: Christopher Tamblyn, Grand Forks, ND (US)

(72) Inventor: Christopher Tamblyn, Grand Forks, ND (US)

( * ) Notice: Subject to any disclaimer, the term of this patent is extended or adjusted under 35 U.S.C. 154(b) by 386 days.

(21) Appl. No.: 17/348,421

(22) Filed: Jun. 15, 2021

(65) Prior Publication Data

US 2022/0394930 A1    Dec. 15, 2022

(51) Int. Cl.
*A01G 3/00*    (2006.01)
*A01G 3/08*    (2006.01)

(52) U.S. Cl.
CPC .......... *A01G 3/08* (2013.01); *A01G 2003/005* (2013.01)

(58) Field of Classification Search
CPC ................................................. A01G 2003/005
See application file for complete search history.

(56) References Cited

U.S. PATENT DOCUMENTS

| 4,883,542 | A | * | 11/1989 | Voneiff | ..................... | B08B 9/36 |
| | | | | | | 15/56 |
| 7,412,330 | B2 | | 8/2008 | Spicer | | |
| 9,295,196 | B2 | | 3/2016 | Surmann | | |
| 9,420,748 | B2 | | 8/2016 | Chan | | |
| 9,878,842 | B2 | * | 1/2018 | Golgotiu | ................ | B65D 85/52 |
| 10,219,449 | B2 | | 3/2019 | Redden | | |
| 2012/0017507 | A1 | * | 1/2012 | Owens, Jr. | ............. | A01G 9/143 |
| | | | | | | 901/30 |
| 2012/0022691 | A1 | * | 1/2012 | Owens, Jr. | ............. | B25J 9/1687 |
| | | | | | | 700/259 |
| 2013/0204437 | A1 | | 8/2013 | Koselka | | |
| 2015/0090088 | A1 | * | 4/2015 | Rodel | ...................... | A01G 3/00 |
| | | | | | | 83/365 |
| 2018/0359922 | A1 | * | 12/2018 | Millar | ..................... | A01D 91/00 |
| 2019/0075732 | A1 | * | 3/2019 | Gowa | ...................... | A01G 5/00 |
| 2021/0291192 | A1 | * | 9/2021 | Kolbet | .................... | A01G 3/00 |
| 2022/0240455 | A1 | * | 8/2022 | Von Rundstedt | ..... | G06T 7/0012 |
| 2022/0354063 | A1 | * | 11/2022 | Fujikawa | ............ | A01G 31/047 |
| 2023/0017444 | A1 | * | 1/2023 | Von Rundstedt | .... | G06V 10/774 |

FOREIGN PATENT DOCUMENTS

AU    2019246911    10/2019

* cited by examiner

*Primary Examiner* — Jessica B Wong
(74) *Attorney, Agent, or Firm* — Jasa (57) ABSTRACT

A *cannabis* trimming assembly includes a pair of conveyors for transporting a *cannabis* plant. A trimming housing is positioned between the pair of conveyors to receive the *cannabis* plant. A pair of trap doors is each movably integrated into the trimming housing. A plurality of cameras is each integrated into the trimming housing to view the *cannabis* plant. A plurality of laser emitters is each integrated into the trimming housing and each of the laser emitters is guided by the cameras to trim shade leaves and buds from the *cannabis*. A grapping claw is integrated into the trimming housing to hang the *cannabis* plant in the trimming housing during trimming.

9 Claims, 9 Drawing Sheets

CANNABIS TRIMMING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to trimming device and more particularly pertains to a new trimming device for automatically trimming a *cannabis* plant for processing. The device includes a housing in which a plurality of cameras and a plurality of laser emitters are positioned. The laser emitters are guided by the cameras to first trim shade leaves from the *cannabis* plant, and subsequently trim buds from the *cannabis* plant.

(2) Description of Related Art Including Information Disclosed Under 37 CFR 1.97 and 1.98

The prior art relates to trimming devices including a plant identification device that includes cameras to indentify physical characteristics of a plant. The prior art discloses a harvester that includes stem cutting attachment. The prior art discloses a pruning device that is remotely controlled for pruning plants. The prior art discloses a robotic plant harvester.

BRIEF SUMMARY OF THE INVENTION

An embodiment of the disclosure meets the needs presented above by generally comprising a pair of conveyors for transporting a *cannabis* plant. A trimming housing is positioned between the pair of conveyors to receive the *cannabis* plant. A pair of trap doors is each movably integrated into the trimming housing. A plurality of cameras is each integrated into the trimming housing to view the *cannabis* plant. A plurality of laser emitters is each integrated into the trimming housing and each of the laser emitters is guided by the cameras to trim shade leaves and buds from the *cannabis*. A grapping claw is integrated into the trimming housing to hang the *cannabis* plant in the trimming housing during trimming.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
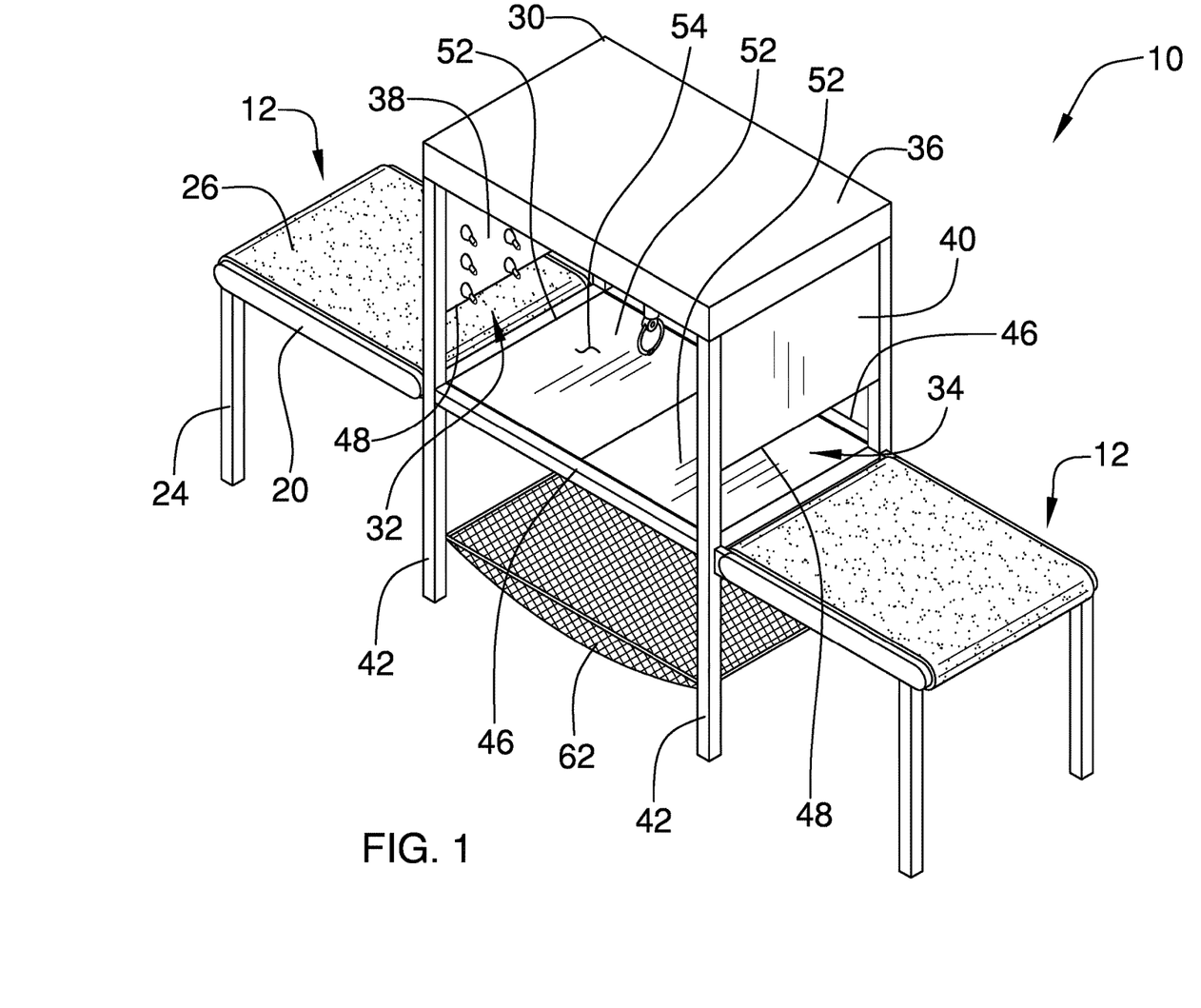
FIG. 1 is a perspective view of a *cannabis* trimming assembly according to an embodiment of the disclosure.
Figure 2:
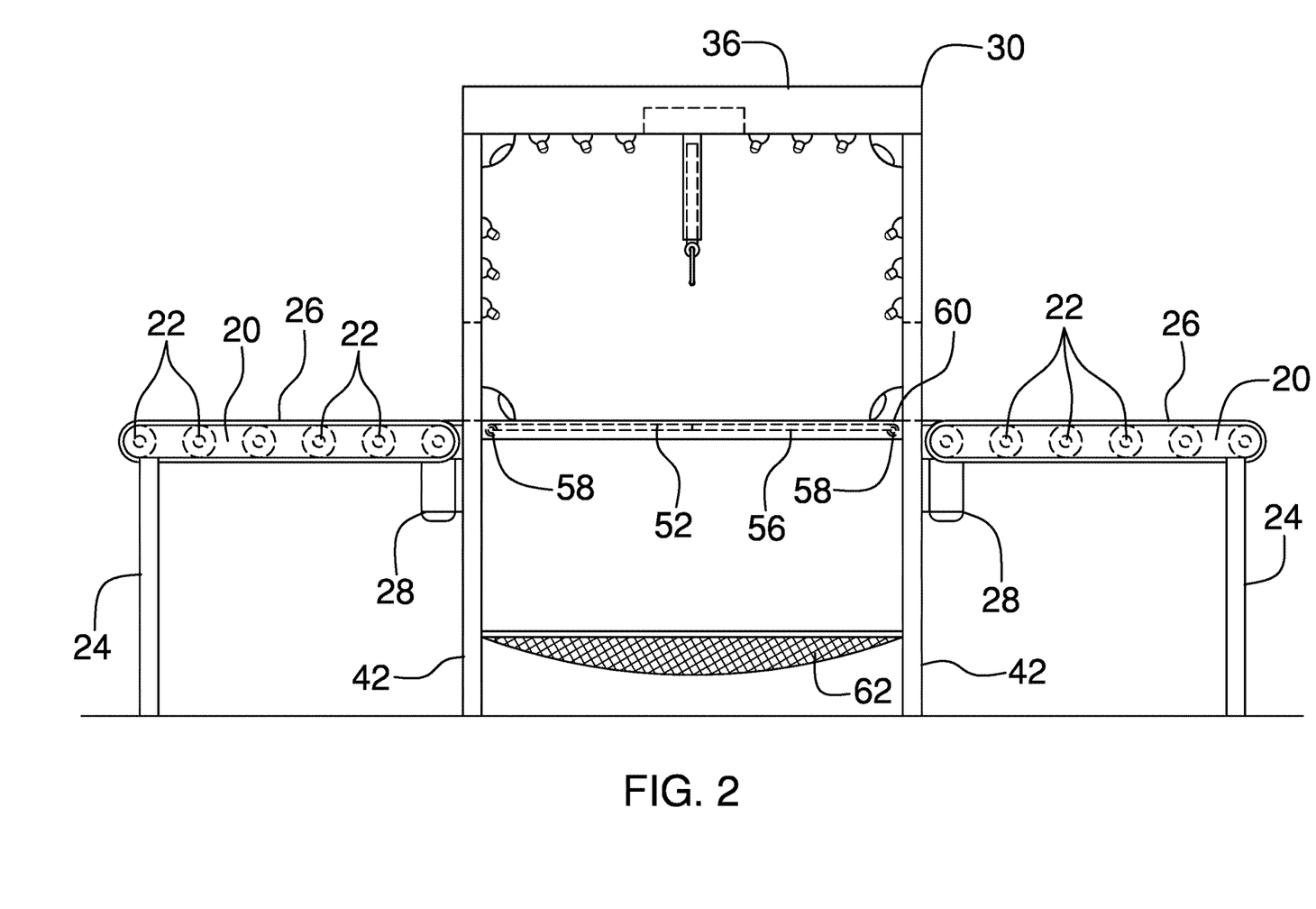
FIG. 2 is a right side phantom view of an embodiment of the disclosure.
Figure 3:
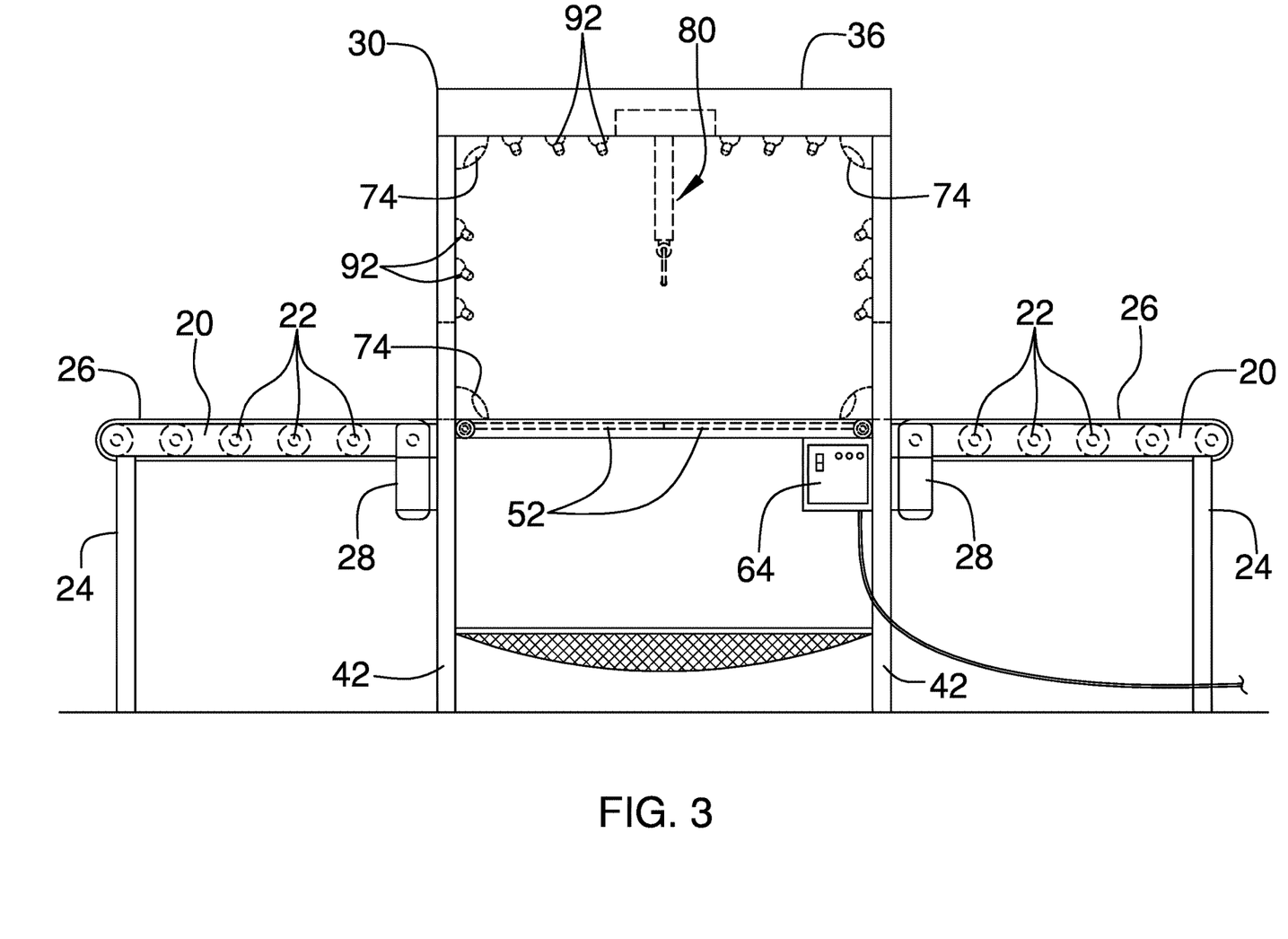
FIG. 3 is a left side phantom view of an embodiment of the disclosure.
Figure 4:
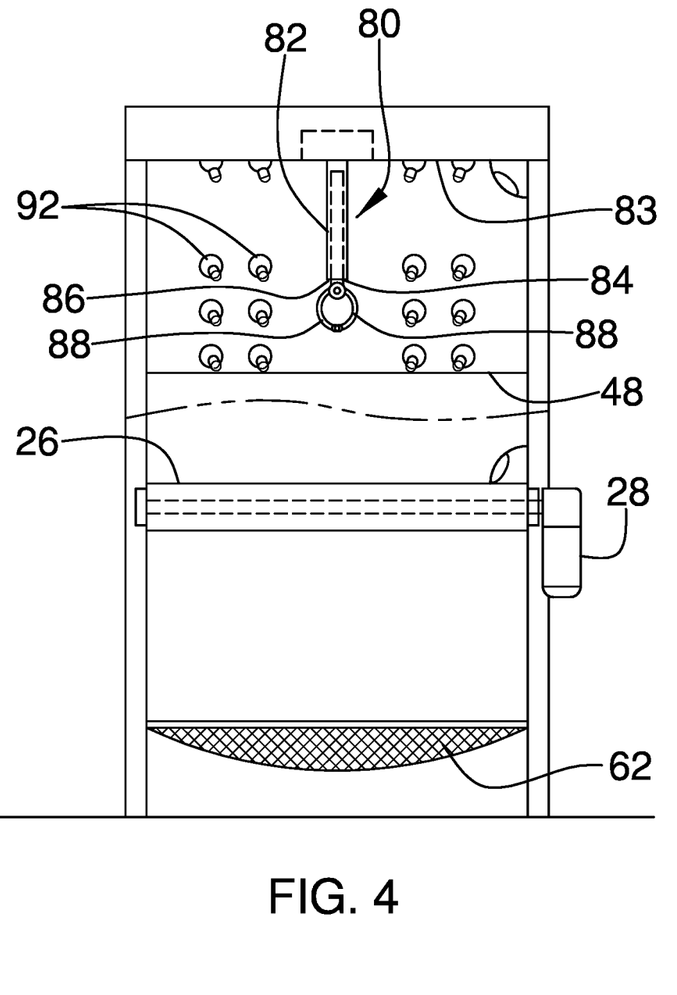
FIG. 4 is a front phantom view of an embodiment of the disclosure.
Figure 5:
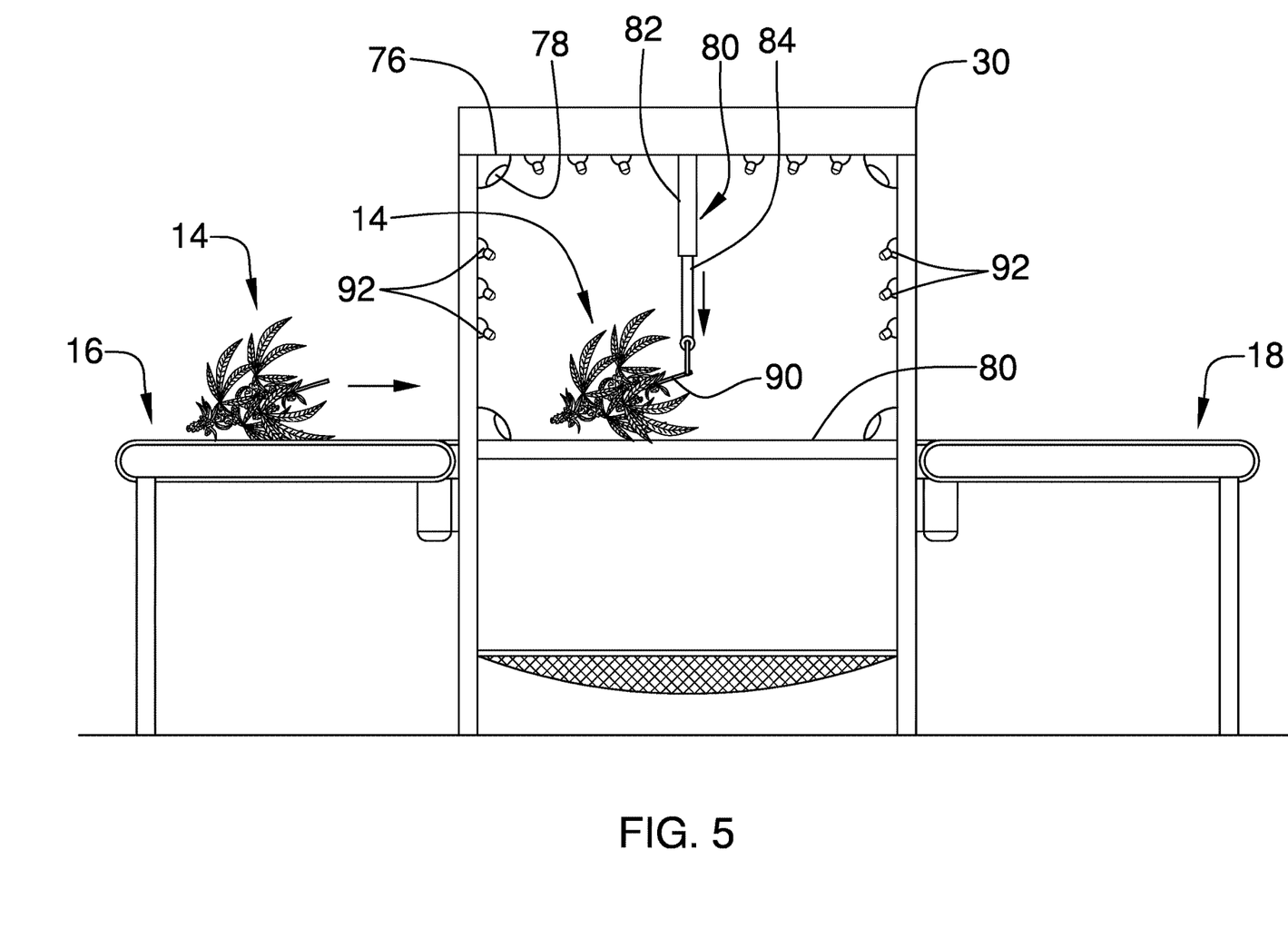
FIG. 5 is a right side in-use view of an embodiment of the disclosure showing a *cannabis* plant being lifted by a grappling claw.
Figure 6:
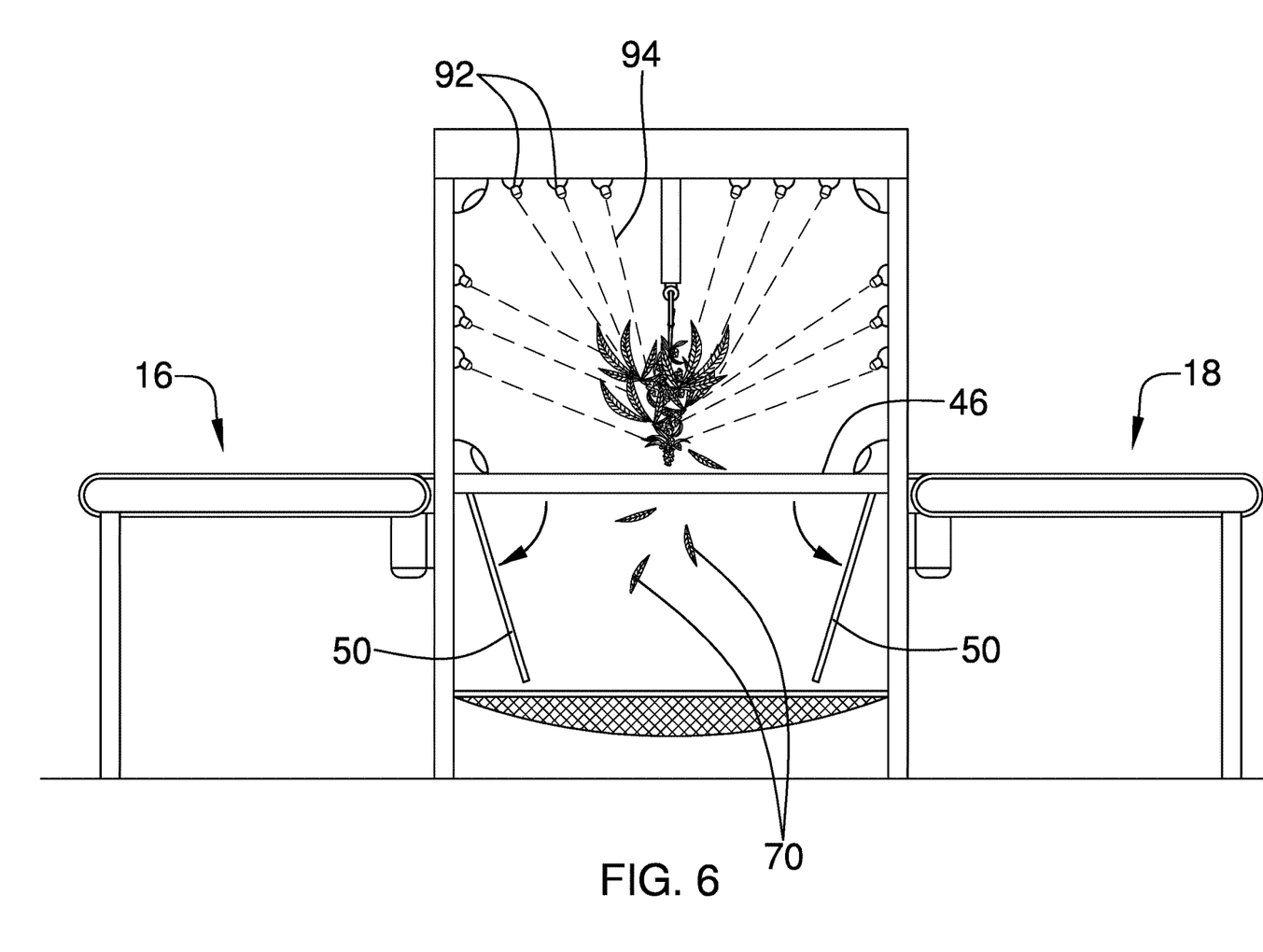
FIG. 6 is a right side in-use view of an embodiment of the disclosure showing shade leaves being trimmed from a *cannabis* plant.
Figure 7:
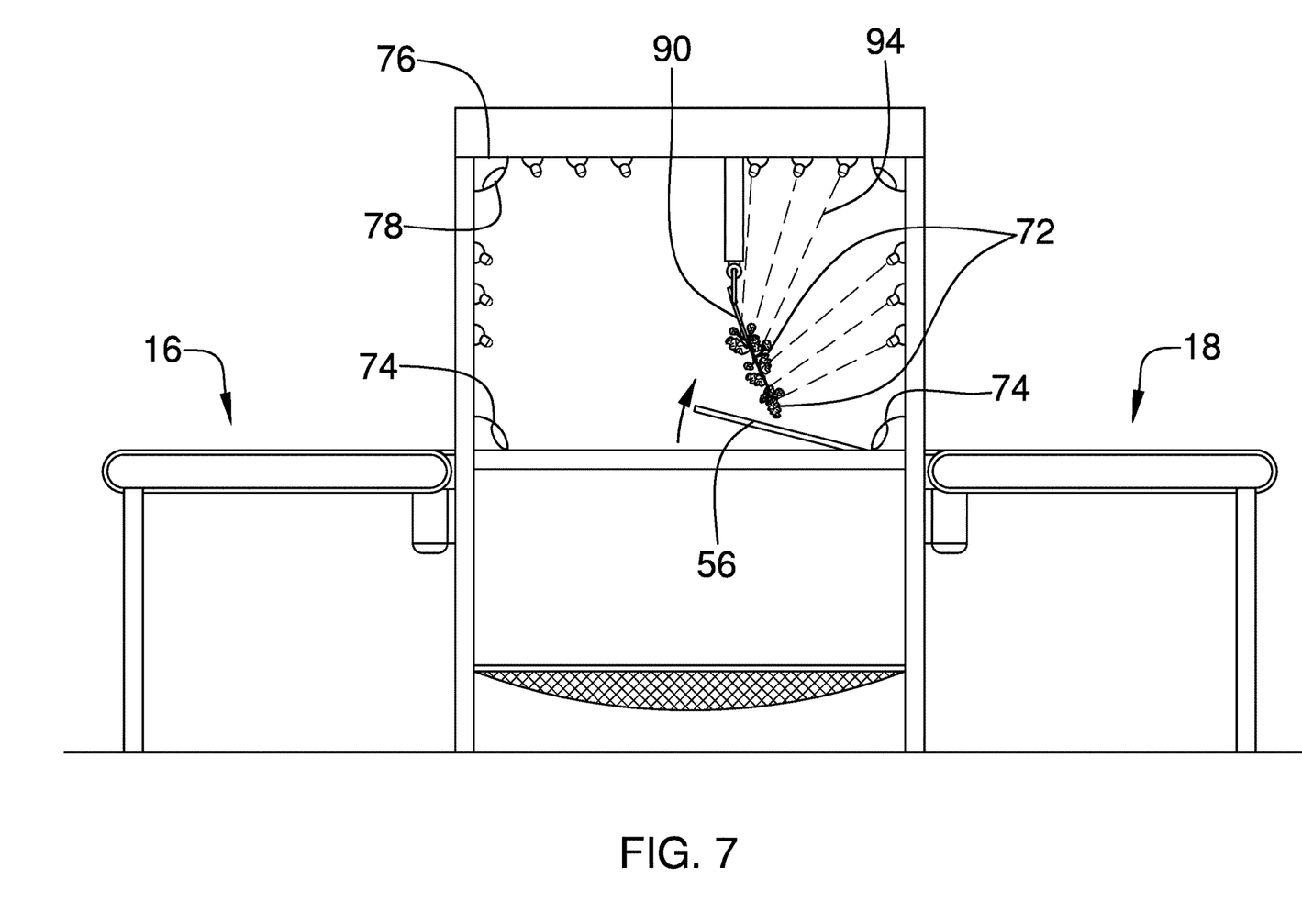
FIG. 7 is a right side in-use view of an embodiment of the disclosure showing buds being trimmed from a *cannabis* plant.
Figure 8:
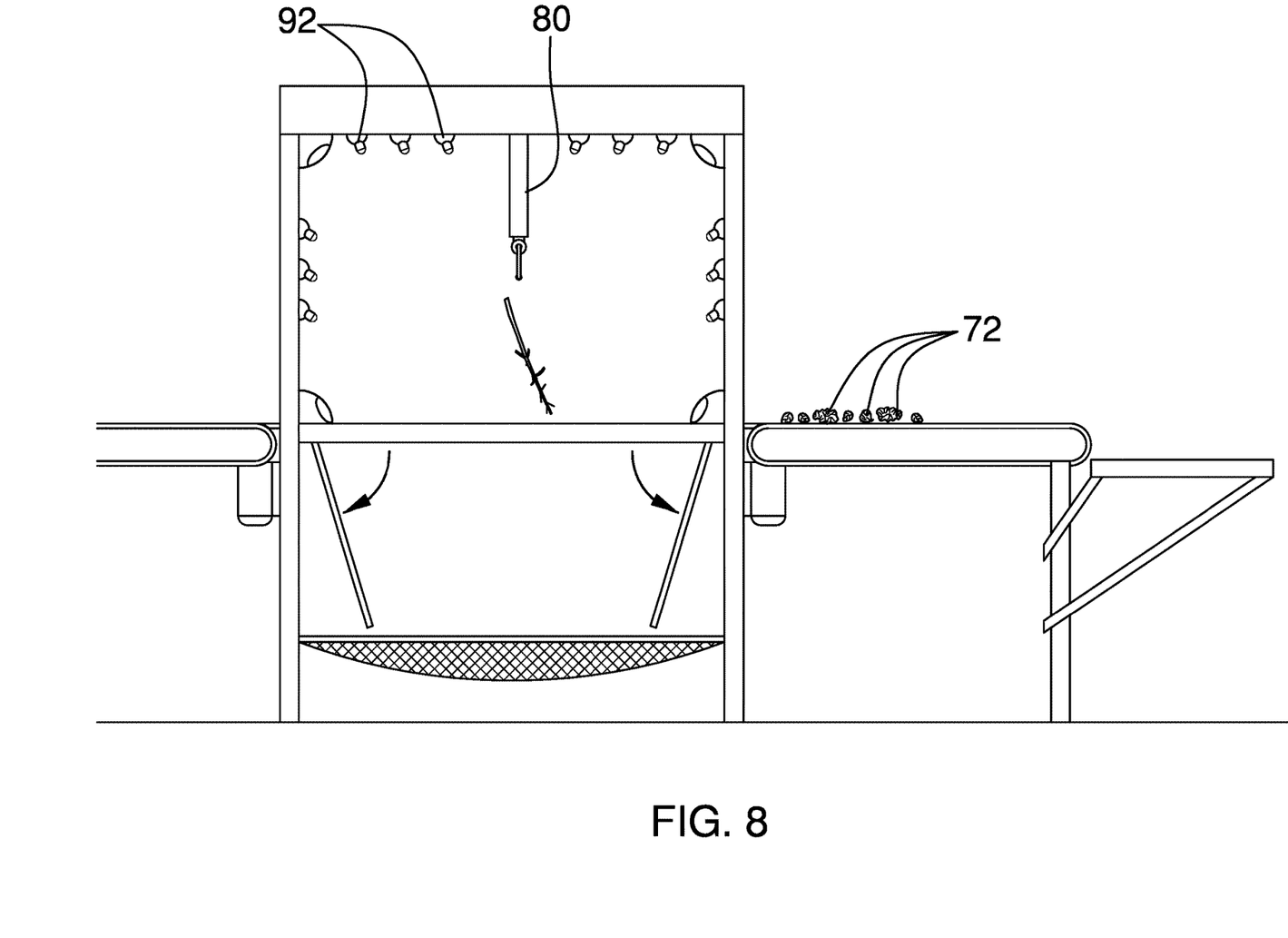
FIG. 8 is a right side in-use view of an embodiment of the disclosure showing buds being transported for processing.
Figure 9:
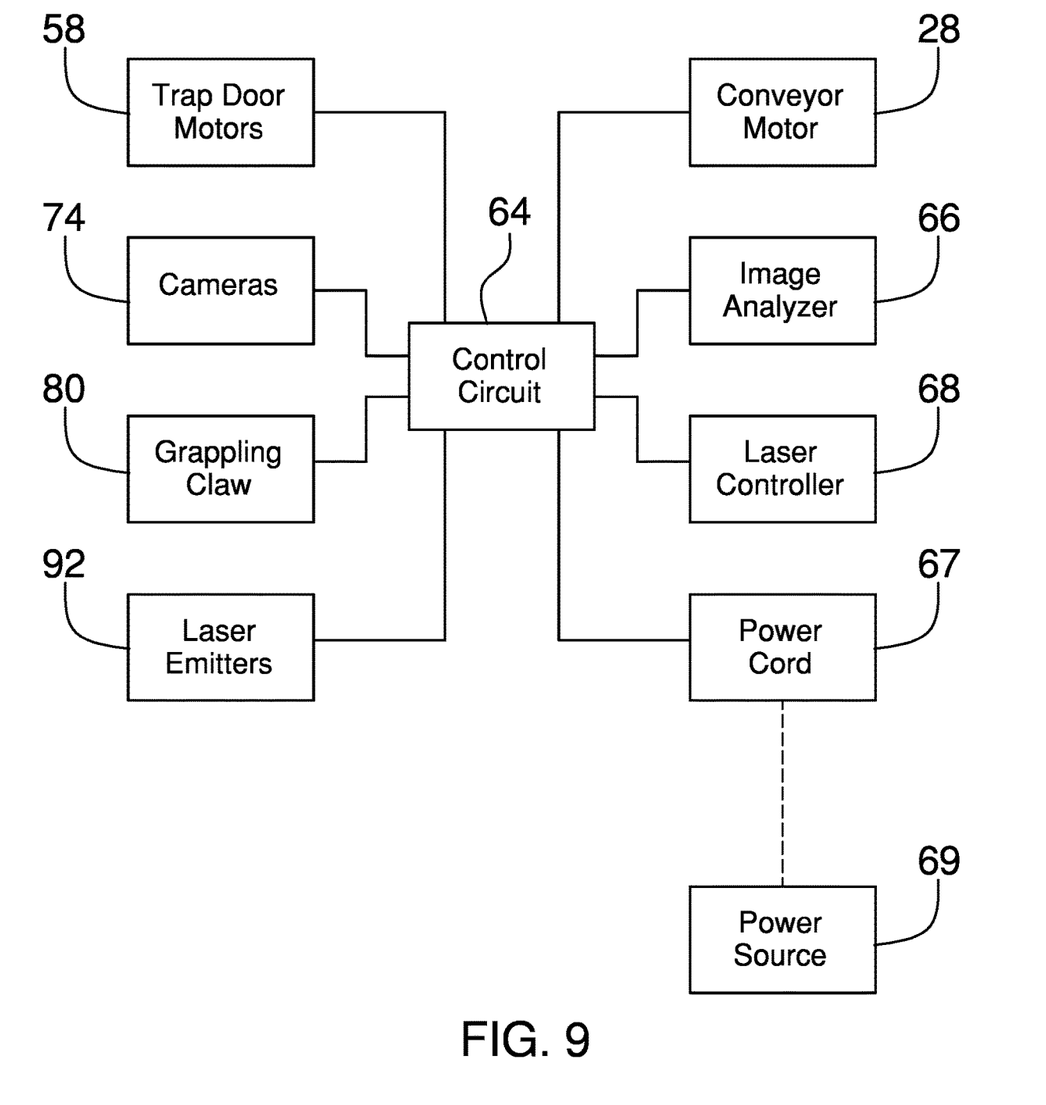
FIG. 9 is a schematic view of an embodiment of the disclosure.

With reference now to the drawings, and in particular to FIGS. 1 through 9 thereof, a new trimming device embodying the principles and concepts of an embodiment of the disclosure and generally designated by the reference numeral 10 will be described.

As best illustrated in FIGS. 1 through 9, the *cannabis* trimming assembly 10 generally comprises a pair of conveyors 12 which each of the move in a first direction to transport a *cannabis* plant 14. The pair of conveyors 12 includes a first conveyor 16 and a second conveyor 18. Each of the conveyors 12 comprises a stand 20 that includes a plurality of rollers 22 that are rotatably integrated into the stand 20 and a plurality of legs 24. Each of the rollers 22 is oriented to extend along a horizontal axis and the rollers 22 is positioned on opposite ends of the stand 20 from each other.

Each of the conveyors 12 includes a belt 26 extending around each of the rollers 22 and the *cannabis* plant 14 is positioned on the belt 26. Each of the conveyors 12 includes a conveyor motor 28 that is coupled to the stand 20 and the conveyor motor 28 is in mechanical communication with a respective one of the rollers 22. The conveyor motor 28 rotates the respective roller in a first direction when the conveyor motor 28 is turned on thereby facilitating the roller to urge the belt 26 to travel in a first direction to transport the *cannabis* plant 14.

A trimming housing 30 is provided that has an entry 32 and an exit 34, and the trimming housing 30 is positioned between the pair of conveyors 12. In this way the entry 32 of the trimming housing 30 receives the *cannabis* plant 14 from a respective one of the conveyors 12. The trimming housing 30 has a top wall 36, a front wall 38, a back wall 40 and a plurality of legs 42 each extending downwardly from the top wall 36 to support the top wall 36 over a support surface 44. The trimming housing 30 includes a plurality of members 46 each extending between each of the legs 24. Each of the members 46 lies on a plane that is coplanar with the top wall 36 and each of the members 46 is spaced from the top wall 36. Each of the front wall 38 and the back wall 40 has a bottom edge 48 that is spaced from a respective one of the members 46 to define a respective one of the entry 32 and the exit 34. The entry 32 is aligned with the first conveyor 16 to receive *cannabis* and the exit 34 is aligned with the second conveyor 18 to deliver the *cannabis* to the second conveyor 18.

A pair of trap doors 50 is each movably integrated into the trimming housing 30 and each of the trap doors 50 is positionable in a closed position or an open position. Each of the trap doors 50 has a first edge 52 and a top surface 54, and the first edge 52 of each of the trap doors 50 is hingedly coupled to a respective one of the members 46. The top surface 54 of each of the trap doors 50 lies on a horizontal plane when the trap doors 50 are in the closed position to support the *cannabis*. Each of the trap doors 50 extends downwardly from the respective member when the trap doors 50 are in the open position to facilitate *cannabis* to fall downwardly out of the trimming housing 30.

An ejecting one of the trap doors 56 is positionable in an ejecting position having the ejecting trap door 56 angling upwardly from the respective member. Moreover, the top surface 54 of the ejecting trap door 56 angles downwardly toward the exit 34 to deliver the *cannabis* to the second conveyor 18. A pair of trap door motors 58 is each integrated into the trimming housing 30 and each of the trap door motors 58 is in mechanical communication with a respective one of the trap doors 50. Each of the trap door motors 58 is actuatable into an opening condition or a closing condition. Each of the trap doors 50 is moved into the closed position when the trap door motors 58 are actuated into the closing condition. Conversely, each of the trap doors 50 is moved into the open position when the trap door motors 58 are actuated into the opening condition. An ejecting one of the trap door motors 60 is actuatable into an ejecting condition and the ejecting trap door 56 is moved into the ejecting position when the ejecting trap door 60 motor is actuated into the ejecting condition. Each of the trap door motors 58 and the ejecting trap door 60 motor may comprise a two direction electric motor or the like.

A net 62 is coupled to the trimming housing 30 and the net 62 is positioned beneath the pair of trap doors 50 to capture *cannabis* that falls through the trap doors 50. The net 62 extends between each of the legs 24 of the trimming housing 30. A control circuit 64 is integrated into the trimming housing 30 and the control circuit 64 includes an image analyzer 66 and the control circuit 64 includes a laser controller 68. The control circuit 64 is electrically coupled to the conveyor motor 28 associated with each of the conveyors 12 and the control circuit 64 is electrically coupled to each of the trap door motors 58. A power cord 67 is coupled to and extends away from the trimming housing 30 and the power cord 67 is electrically coupled to the control circuit 64. The power cord 67 is pluggable into a power source 69 comprising a female electrical outlet.

The image analyzer 66 performs a shade leaf routine to identify shade leaves 70 on the *cannabis*, and each of the trap doors 50 is moved into the open position when the image analyzer 66 performs the shade leaf routine. The image analyzer 66 performs a bud routine to identify buds 72 on the *cannabis* and each of the trap doors 50 is moved into the closed position when the image analyzer 66 performs the bud routine. Additionally, the ejecting trap 60 door is moved into the ejecting position when the analyzer completes the bud routine. The image analyzer 66 may include operational software for identifying the structure of a *cannabis* plant 14, including stems, shade leaves 70 and buds 72.

A plurality of cameras 74 is each integrated into the trimming housing 30 and each of the cameras 74 is directed into an interior of the trimming housing 30. In this way each of the cameras 74 can view the *cannabis* plant 14 when the *cannabis* plant 14 is transported into the trimming housing 30. Each of the cameras 74 is electrically coupled to the control circuit 64 such that the image analyzer 66 receives imagery to identify strategic locations on the *cannabis* plant 14 for trimming buds 72 from the *cannabis* plant 14. Each of the cameras 74 is positioned in a respective one of four corners of the trimming housing 30, and each of the cameras 74 comprises a dome 76 and a lens 78 that is integrated into the dome 76. The dome 76 is attached to the trimming housing 30 having the lens 78 being directed into the interior of the trimming housing 30. Additionally, each of the cameras 74 may comprise a digital video camera or the like.

A grappling claw 80 is integrated into the trimming housing 30 and the grappling claw 80 is actuatable to extend into the trimming housing 30 to grasp the *cannabis* plant 14. The grappling claw 80 is actuatable to lift upwardly in the trimming housing 30 to hang the *cannabis* plant 14 in the trimming housing 30. The grappling claw 80 has a first section 82 extending downwardly from a bottom surface 83 of the top wall 36 of the trimming housing 30 and a second section 84 that slidably engages the first section 82. The second section 84 is urgeable upwardly or downwardly in the first section 82, and the second section 84 has a distal end 86 with respect to the first section 82.

The grappling claw 80 includes a pair of jaws 88 that is each disposed on the distal end 86 of the second section 84. The jaws 88 are urgeable into a gripping position having the jaws 88 engaging each other to grip a stem 90 of the *cannabis* plant 14. The jaws 88 are urgeable into a releasing position having the jaws 88 being spaced apart from each other to release the stem 90 of the *cannabis* plant 14. The grappling claw 80 includes electromechanical actuators and each of the electromechanical actuators is electrically coupled to the control circuit 64. Additionally, the grappling claw 80 is guided by the cameras 74 for locating and subsequently gripping the stem of the *cannabis* plant 14 when the *cannabis* plant 14 is lying on the trap doors 50. Each of the A plurality of laser emitters 92 is each integrated into the trimming housing 30 to emit a laser beam 94 into an interior of the trimming housing 30. Each of the laser emitters 92 is guided by the cameras 74 to trim shade leaves 70 and buds 72 from the *cannabis* plant 14 and each of the laser emitters is electrically coupled to the control circuit 64. The laser emitters 92 are spaced apart from each other and are distributed around the trimming housing 30. In this way the plurality of laser emitters 92 surround the *cannabis* plant 14 when the *cannabis* plant 14 is inside the trimming housing 30. Each of the laser emitters 92 may comprise a laser light emitter that has an output rating sufficient to cut through stems of the *cannabis* plant 14. In this way the laser emitters 92 can trim shade leaves 70 and buds 72 from the *cannabis* plant 14. Additionally, each of the laser emitters 92 can emit the laser beam in a plurality of directions for precisely trimming the *cannabis* plant 14.

In use, the first conveyor 16 transports the *cannabis* plant 14 into the trimming housing 30 and the grappling claw 80 grips the stem 90 of the *cannabis* plant 14 in order to suspend the *cannabis* plant 14 in an inverted orientation in the trimming housing 30. The image analyzer 66 analyzes the structure of the *cannabis* plant 14 and the laser emitters 92 are fired to trim shade leaves 70 from the *cannabis* plant 14. The trap doors 50 are opened to facilitate the shade leaves 70 to collect in the net 62. The trap doors 50 are closes and the laser emitters 92 are fired to trim the buds 72 from the *cannabis* plant 14. The ejecting trap door 56 is moved into the ejecting position to dump the buds 72 on the second conveyor 18 to transport the buds 72 out of the trimming housing 30 for subsequent processing. In this way the *cannabis* plant 14 can be automatically trimmed for processing without the need of manual labor.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A *cannabis* trimming assembly for automatically trimming leaves and buds from a *cannabis* plant, said assembly comprising:
   a pair of conveyors, each of said moving in a first direction wherein each of said conveyors is configured to transport a *cannabis* plant, said pair of conveyors including a first conveyor and a second conveyor;
   a trimming housing having an entry and an exit, said trimming housing being positioned between said pair of conveyors wherein said trimming housing is configured to facilitate the *cannabis* plant to pass through said entry and said exit;
   a pair of trap doors, each of said trap doors being movably integrated into said trimming housing, each of said trap doors being positionable in a closed position or an open position;
   a net being coupled to said trimming housing, said net being positioned beneath said pair of trap doors wherein said net is configured to capture *cannabis* that falls through said trap doors;
   a plurality of cameras, each of said cameras being integrated into said trimming housing, each of said cameras being directed into an interior of said trimming housing wherein each of said cameras is configured to view the *cannabis* plant when the *cannabis* plant is transported into said trimming housing;
   a plurality of laser emitters, each of said laser emitters being integrated into said trimming housing wherein each of said laser emitters is configured to emit a laser beam into an interior of said trimming housing, each of said laser emitters being guided by said cameras wherein said plurality of laser emitters are configured to trim shade leaves and buds from the *cannabis*; and
   a grapping claw being integrated into said trimming housing, said grappling claw being actuatable to extend into said trimming housing wherein said grappling claw is configured to grasp the *cannabis* plant, said grappling claw being actuatable to lift upwardly in said trimming housing wherein said grappling claw is configured to hang the *cannabis* plant in said trimming housing.

2. The assembly according to claim 1, wherein each of said conveyors comprises:
   a stand including a plurality of rollers being rotatably integrated into said stand and a plurality of legs, each of said rollers being oriented to extend along a horizontal axis, said rollers being positioned on opposite ends of said stand from each other;
   a belt extending around each of said rollers wherein said belt is configured to have the *cannabis* plant positioned on said belt; and
   a conveyor motor being coupled to said stand, said conveyor motor being in mechanical communication with a respective one of said rollers, said conveyor motor rotating said respective roller in a first direction when said conveyor motor is turned on thereby facilitating said roller to urge said belt to travel in a first direction wherein said belt is configured to transport the *cannabis* plant.

3. The assembly according to claim 1, wherein said trimming housing has a top wall, a front wall, a back wall and a plurality of legs each extending downwardly from said top wall wherein each of said legs is configured to support said top wall over a support surface, said trimming housing including a plurality of members each extending between each of said legs, each of said members lying on a plane being coplanar with said top wall, each of said members being spaced from said top wall, each of said front wall and said back wall having a bottom edge being spaced from a respective one of said members to define a respective one of said entry and said exit, said entry being aligned with said first conveyor wherein said entry is configured to receive *cannabis*, said exit being aligned with said second conveyor wherein said exit is configured to deliver the *cannabis* to said second conveyor.

4. The assembly according to claim 3, wherein each of said trap doors has a first edge and a top surface, said first edge of each of said trap doors being hingedly coupled to a respective one of said members, said top surface of each of said trap doors lying on a horizontal plane when said trap doors are in said closed position wherein said trap doors are configured to support the *cannabis*, each of said trap doors extending downwardly from said respective member when said trap doors are in the open position wherein said trap doors are configured to facilitate the *cannabis* to fall downwardly out of said trimming housing.

5. The assembly according to claim 3, wherein an ejecting one of said trap doors is positionable in an ejecting position having said ejecting trap door angling upwardly from said respective member, said top surface of said ejecting trap door angling downwardly toward said exit wherein said ejecting trap door is configured to deliver the *cannabis* to said second conveyor.

6. The assembly according to claim 1, wherein:
each of said conveyors includes a conveyor motor;
each of said trap doors includes a trap door motor;
said assembly includes a control circuit being integrated into said trimming housing, said control circuit including an image analyzer, said control circuit including a laser controller, said control circuit being electrically coupled to said conveyor motor associated with each of said conveyors, said control circuit being electrically coupled to each of said trap door motors;
said image analyzer performs a shade leaf routine wherein said image analyzer is configured to identify shade leaves on the *cannabis*, each of said trap doors being moved into said open position when said image analyzer performs said shade leaf routine; and
said image analyzer performs a bud routine wherein said image analyzer is configured to identify buds on the *cannabis*, each of said trap doors being moved into said closed position when said image analyzer performs said bud routine, said ejecting door being moved into said ejecting position when said analyzer completes said bud routine.

7. The assembly according to claim 6, wherein each of said cameras is electrically coupled to said control circuit such that said image analyzer receives imagery from said cameras wherein said image analyzer is configured to identify strategic locations on the *cannabis* plant for trimming, each of said cameras being positioned in a respective one of four corners of said trimming housing, each of said cameras comprising a dome and a lens being integrated into said dome, said dome being attached to said trimming housing having said lens being directed into said interior of said trimming housing.

8. The assembly according to claim 2, wherein said grappling claw has a first section extending downwardly from a bottom surface of said top wall of said trimming housing and a second section slidably engaging said first section, said second section being urgeable upwardly or downwardly in said first section, said second section having a distal end with respect to said first section, said grapping claw including a pair of jaws each being disposed on said distal end of said second section, said jaws being urgeable into a gripping position having said jaws engaging each other wherein said jaws are configured to grip a stem of the *cannabis* plant, said jaws being urgeable into a releasing position having said jaws being spaced apart from each other wherein said jaws are configured to release the stem of the *cannabis* plant.

9. A *cannabis* trimming assembly for automatically trimming leaves and buds from a *cannabis* plant, said assembly comprising:
a pair of conveyors, each of said moving in a first direction wherein each of said conveyors is configured to transport a *cannabis* plant, said pair of conveyors including a first conveyor and a second conveyor, each of said conveyors comprising:
a stand including a plurality of rollers being rotatably integrated into said stand and a plurality of legs, each of said rollers being oriented to extend along a horizontal axis, said rollers being positioned on opposite ends of said stand from each other;
a belt extending around each of said rollers wherein said belt is configured to have the *cannabis* plant positioned on said belt; and
a conveyor motor being coupled to said stand, said conveyor motor being in mechanical communication with a respective one of said rollers, said conveyor motor rotating said respective roller in a first direction when said conveyor motor is turned on thereby facilitating said roller to urge said belt to travel in a first direction wherein said belt is configured to transport the *cannabis* plant;
a trimming housing having an entry and an exit, said trimming housing being positioned between said pair of conveyors wherein said trimming housing is configured to receive the *cannabis* plant from a respective one of said conveyors, said trimming housing having a top wall, a front wall, a back wall and a plurality of legs each extending downwardly from said top wall wherein each of said legs is configured to support said top wall over a support surface, said trimming housing including a plurality of members each extending between each of said legs, each of said members lying on a plane being coplanar with said top wall, each of said members being spaced from said top wall, each of said front wall and said back wall having a bottom edge being spaced from a respective one of said members to define a respective one of said entry and said exit, said entry being aligned with said first conveyor wherein said entry is configured to receive *cannabis*, said exit being aligned with said second conveyor wherein said exit is configured to deliver the *cannabis* to said second conveyor;
a pair of trap doors, each of said trap doors being movably integrated into said trimming housing, each of said trap doors being positionable in a closed position or an open position, each of said trap doors having a first edge and a top surface, said first edge of each of said trap doors being hingedly coupled to a respective one of said members, said top surface of each of said trap doors lying on a horizontal plane when said trap doors are in said closed position wherein said trap doors are configured to support the *cannabis*, each of said trap doors extending downwardly from said respective member when said trap doors are in the open position wherein said trap doors are configured to facilitate the *cannabis* to fall downwardly out of said trimming housing, an ejecting one of said trap doors being positionable in an ejecting position having said ejecting trap door angling upwardly from said respective member, said top surface of said ejecting trap door angling downwardly toward said exit wherein said ejecting trap door is configured to deliver the *cannabis* to said second conveyor;
a pair of trap door motors, each of said trap door motors being integrated into said trimming housing, each of said trap door motors being in mechanical communication with a respective one of said trap doors, each of said trap door motors being actuatable into an opening condition or a closing condition, each of said trap doors being moved into said closed position when said trap door motors are actuated into said closing condition, each of said trap doors being moved into said open position when said trap door motors are actuated into said opening condition, an ejecting one of said trap door motors being actuatable into an ejecting condition, said ejecting trap door being moved into said ejecting position when said ejecting motor is actuated into said ejecting condition;

a net being coupled to said trimming housing, said net being positioned beneath said pair of trap doors wherein said net is configured to capture cannabis that falls through said trap doors, said net extending between each of said legs of said trimming housing;

a control circuit being integrated into said trimming housing, said control circuit including an image analyzer, said control circuit including a laser controller, said control circuit being electrically coupled to said conveyor motor associated with each of said conveyors, said control circuit being electrically coupled to each of said trap door motors, said image analyzer performing a shade leaf routine wherein said image analyzer is configured to identify shade leaves on the cannabis, each of said trap doors being moved into said open position when said image analyzer performs said shade leaf routine, said image analyzer performing a bud routine wherein said image analyzer is configured to identify buds on the cannabis, each of said trap doors being moved into said closed position when said image analyzer performs said bud routine, said ejecting door being moved into said ejecting position when said analyzer completes said bud routine;

a plurality of cameras, each of said cameras being integrated into said trimming housing, each of said cameras being directed into an interior of said trimming housing wherein each of said cameras is configured to view the cannabis plant when the cannabis plant is transported into said trimming housing, each of said cameras being electrically coupled to said control circuit such that said image analyzer receives imagery from said cameras wherein said image analyzer is configured to identify strategic locations on the cannabis plant for trimming, each of said cameras being positioned in a respective one of four corners of said trimming housing, each of said cameras comprising a dome and a lens being integrated into said dome, said dome being attached to said trimming housing having said lens being directed into said interior of said trimming housing;

a grappling claw being integrated into said trimming housing, said grappling claw being actuatable to extend into said trimming housing wherein said grappling claw is configured to grasp the cannabis plant, said grappling claw being actuatable to lift upwardly in said trimming housing wherein said grappling claw is configured to hang the cannabis plant in said trimming housing, said grappling claw having a first section extending downwardly from a bottom surface of said top wall of said trimming housing and a second section slidably engaging said first section, said second section being urgeable upwardly or downwardly in said first section, said second section having a distal end with respect to said first section, said grapping claw including a pair of jaws each being disposed on said distal end of said second section, said jaws being urgeable into a gripping position having said jaws engaging each other wherein said jaws are configured to grip a stem of the cannabis plant, said jaws being urgeable into a releasing position having said jaws being spaced apart from each other wherein said jaws are configured to release the stem of the cannabis plant, said gripping claw including electromechanical actuators, each of said electromechanical actuators being electrically coupled to said control circuit, said gripping claw being guided by said cameras for gripping the stem of the cannabis plant; and a plurality of laser emitters, each of said laser emitters being integrated into said trimming housing wherein each of said laser emitters is configured to emit a laser beam into an interior of said trimming housing, each of said laser emitters being guided by said cameras wherein said plurality of laser emitters are configured to trim shade leaves and buds from the cannabis, each of said laser emitters being electrically coupled to said control circuit, said laser emitters being spaced apart from each other and being distributed around said trimming housing wherein said plurality of lasers is configured to surround the cannabis plant when the cannabis plant is inside said trimming housing.

* * * * *